US012769850B1

(12) United States Patent
Iyer et al.

(10) Patent No.: US 12,769,850 B1
(45) Date of Patent: Oct. 20, 2026

(54) MULTI-THREADED COMPLIANCE ASSESSMENT PROCESSING

(71) Applicant: Kovr.AI Corp., Reston, VA (US)

(72) Inventors: Sri Iyer, Reston, VA (US); Andrew Black, Reston, VA (US)

(73) Assignee: Kovr.AI Corp., Reston, VA (US)

( * ) Notice: Subject to any disclaimer, the term of this patent is extended or adjusted under 35 U.S.C. 154(b) by 90 days.

(21) Appl. No.: 19/280,831

(22) Filed: Jul. 25, 2025

(51) Int. Cl.
*G06F 21/57* (2013.01)
*G06F 9/50* (2006.01)
*G06Q 30/018* (2023.01)
*G06F 11/34* (2006.01)

(52) U.S. Cl.
CPC .......... *G06F 21/577* (2013.01); *G06F 9/5027* (2013.01); *G06Q 30/018* (2013.01); *G06F 11/3409* (2013.01); *G06F 11/3452* (2013.01); *G06F 11/3466* (2013.01)

(58) Field of Classification Search
CPC ... G06Q 30/018; G06F 9/5027; G06F 21/577; G06F 11/3466; G06F 11/3409; G06F 11/3452
See application file for complete search history.

(56) References Cited

U.S. PATENT DOCUMENTS 11,533,296 B2 * 12/2022 Adam ................... G06F 21/577
2012/0102543 A1 * 4/2012 Kohli ...................... H04L 63/20 726/1
2024/0296461 A1 * 9/2024 Beyer .................. G06Q 30/018
2025/0258708 A1 * 8/2025 Crabtree ............... G06F 9/5027

FOREIGN PATENT DOCUMENTS

CN 117632404 A * 3/2024 ........... G06F 9/5038

OTHER PUBLICATIONS

"How to Unlock the Power of Your Compliance Monitoring and Testing Program"—KPMG, Aug. 2024 https://kpmg.com/kpmg-us/content/dam/kpmg/pdf/2024/how-unlock-power-compliance-monitoring-testing-program.pdf (Year: 2024).*
"Parallelism and Multithreading in High-Performance Computing"—Abhinav Chunchu, Wilmington University, IJRCAIT, vol. 7, Issue 2, Dec. 2024 https://www.researchgate.net/publication/385700631_Parallelism_and_Multithreading_in_High-Performance_Computing (Year: 2024).*

* cited by examiner

*Primary Examiner* — Randy A Scott
(74) *Attorney, Agent, or Firm* — Esplin & Associates, PC

(57) ABSTRACT

Methods, systems, and devices for multi-threaded compliance assessment processing are described. In some implementations, a system may receive a plurality of compliance controls for evaluation, wherein each compliance control is associated with a corresponding assessment task. The system may assign individual assessment tasks to separate threads of a multi-core processor for concurrent execution. The assessment tasks may be processed in parallel across the separate threads to generate individual compliance results. The system may then aggregate the compliance results from the separate threads into a unified compliance assessment output, enabling efficient and scalable evaluation of compliance frameworks.

20 Claims, 8 Drawing Sheets

MULTI-THREADED COMPLIANCE ASSESSMENT PROCESSING

FIELD OF TECHNOLOGY

The present disclosure relates generally to database systems and data processing, and more specifically to multi-threaded compliance assessment processing.

BACKGROUND

Compliance assessment involves evaluating adherence to regulatory, security, and operational frameworks. This process may require the analysis of numerous individual controls, each representing specific criteria or standards that must be met. Organizations often utilize computing systems to facilitate these evaluations, which may include frameworks for managing data, processing tasks, and generating reports.

SUMMARY

The described techniques relate to improved methods, systems, devices, and apparatuses that support techniques for multi-threaded compliance assessment processing. Some implementations introduce a multi-threaded system for compliance assessment processing that may significantly accelerate the evaluation of compliance controls. By leveraging advanced computing infrastructure equipped with multi-core processors, the system may assign individual compliance controls or assessment tasks to separate threads, enabling simultaneous processing. This parallel processing approach may eliminate the inefficiencies of sequential methods, allowing the system to complete evaluations in a fraction of the time required by traditional systems. By distributing compliance tasks across multiple threads, some implementations may achieve scalability, high throughput, and minimal latency, addressing the challenges of large-scale compliance frameworks and modern data center environments.

A method for multi-threaded compliance assessment processing is described. The method may include receiving a plurality of compliance controls for evaluation, wherein each compliance control may be associated with a corresponding assessment task. The method may include assigning individual assessment tasks to separate threads of a multi-core processor for concurrent execution. The method may include processing the assessment tasks in parallel across the separate threads to generate individual compliance results. The method may include aggregating the compliance results from the separate threads into a unified compliance assessment output.

Compliance assessment may be uniquely suited to a multi-threaded processing approach due to the inherently modular and parallelizable nature of compliance control evaluations. Each compliance control may correspond to a distinct set of assessment criteria and data sources, enabling tasks to be evaluated independently without introducing interdependencies that would otherwise limit concurrency. As a result, the assessment of multiple controls may be assigned to separate processor threads for simultaneous execution, which may improve overall throughput and responsiveness of the system. This characteristic may align well with the architecture of modern multi-core processors, which are optimized for parallel task execution.

Compliance frameworks (e.g., those based on NIST 800-53, FedRAMP, CMMC, etc.) may involve hundreds of discrete controls, each of which may require the analysis of different logs, configurations, or security artifacts. The large volume and diversity of assessment tasks may create processing bottlenecks when handled sequentially. However, through multi-threaded distribution, the system may dynamically scale to accommodate this complexity by processing controls in parallel, reducing evaluation latency and enabling near-real-time assessment cycles. This threading approach may therefore provide a practical and efficient means to address the growing demand for continuous monitoring and rapid audit readiness in highly regulated environments.

A system configured for multi-threaded compliance assessment processing is described. The system may include a processor and memory coupled with the processor. The system may include instructions stored in the memory and executable by the processor to cause the system to receive a plurality of compliance controls for evaluation, wherein each compliance control may be associated with a corresponding assessment task. The system may assign individual assessment tasks to separate threads of a multi-core processor for concurrent execution. The system may process the assessment tasks in parallel across the separate threads to generate individual compliance results. The system may aggregate the compliance results from the separate threads into a unified compliance assessment output.

Another system for multi-threaded compliance assessment processing is described. The system may include means for receiving a plurality of compliance controls for evaluation, wherein each compliance control may be associated with a corresponding assessment task. The system may include means for assigning individual assessment tasks to separate threads of a multi-core processor for concurrent execution. The system may include means for processing the assessment tasks in parallel across the separate threads to generate individual compliance results. The system may include means for aggregating the compliance results from the separate threads into a unified compliance assessment output.

A non-transitory computer-readable medium storing code for multi-threaded compliance assessment processing is described. The code may include instructions executable by a processor to receive a plurality of compliance controls for evaluation, wherein each compliance control may be associated with a corresponding assessment task. The code may include instructions executable by a processor to assign individual assessment tasks to separate threads of a multi-core processor for concurrent execution. The code may include instructions executable by a processor to process the assessment tasks in parallel across the separate threads to generate individual compliance results. The code may include instructions executable by a processor to aggregate the compliance results from the separate threads into a unified compliance assessment output.

Some examples of the method, systems, and non-transitory computer-readable medium described herein may further include operations, features, means, or instructions for assigning priority levels to the assessment tasks based on predefined criteria. The separate threads may process higher-priority tasks before lower-priority tasks.

Some examples of the method, systems, and non-transitory computer-readable medium described herein may further include operations, features, means, or instructions for storing intermediate compliance results generated by the separate threads in a high-speed storage system. The intermediate compliance results may be retrieved for aggregation into the unified compliance assessment output.

Some examples of the method, systems, and non-transitory computer-readable medium described herein may further include operations, features, means, or instructions for monitoring execution of the separate threads to detect processing anomalies. Detected anomalies may trigger reassignment of the affected assessment tasks to available separate threads.

Some examples of the method, systems, and non-transitory computer-readable medium described herein may further include operations, features, means, or instructions for encrypting the compliance results generated by the separate threads prior to aggregation. The encryption may ensure secure transmission of the unified compliance assessment output.

Some examples of the method, systems, and non-transitory computer-readable medium described herein may further include operations, features, means, or instructions for dynamically allocating processor cores to the separate threads based on workload distribution. The allocation may adjust in response to changes in the number of assessment tasks.

Some examples of the method, systems, and non-transitory computer-readable medium described herein may further include operations, features, means, or instructions for generating metadata for the compliance results produced by the separate threads. The metadata may include timestamps and thread identifiers for tracking processing history.

Some examples of the method, systems, and non-transitory computer-readable medium described herein may further include operations, features, means, or instructions for validating the compliance results generated by the separate threads against predefined accuracy thresholds. Validation failures may trigger reprocessing of the corresponding assessment tasks.

Some examples of the method, systems, and non-transitory computer-readable medium described herein may further include operations, features, means, or instructions for compressing the compliance results generated by the separate threads prior to aggregation. The compression may reduce data size for efficient storage and transmission.

Some examples of the method, systems, and non-transitory computer-readable medium described herein may further include operations, features, means, or instructions for assigning assessment tasks to the separate threads based on task complexity. Threads with higher processing capacity may handle more complex tasks.

DETAILED DESCRIPTION

Figure 1:
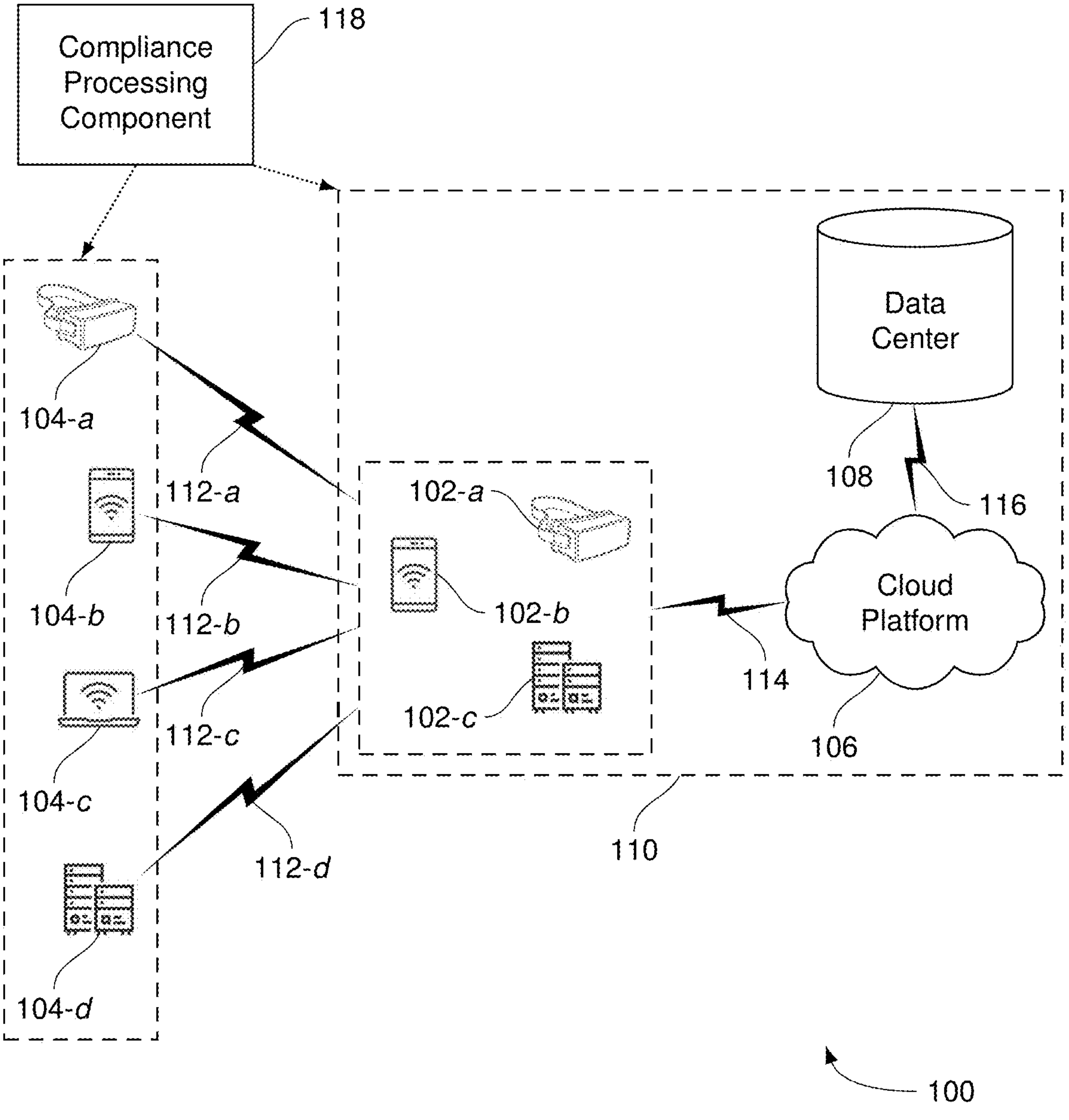
FIG. 1 illustrates an example of a system for data processing that supports multi-threaded compliance assessment processing in accordance with aspects of the present disclosure.

Methods, systems, devices, and apparatuses that support techniques for multi-threaded compliance assessment processing are disclosed. In some examples, traditional compliance assessment methods may be constrained by inefficiencies inherent in sequential processing. These systems may evaluate compliance controls one at a time, resulting in prolonged assessment durations and increased operational costs. The limitations of single-threaded architectures may be particularly pronounced in environments with large-scale compliance frameworks, where the volume of controls may overwhelm existing systems. Furthermore, the inability to scale effectively in response to growing regulatory demands and complex infrastructures may create bottlenecks that hinder timely evaluations. Organizations may require solutions that address these inefficiencies while ensuring high throughput, minimal latency, and reliable performance.

According to some implementations, a system may utilize a multi-threaded processing architecture to divide compliance assessment tasks into multiple threads. Each thread may be assigned a specific compliance control or assessment task, allowing simultaneous processing of multiple controls. This may enable the system to process tasks concurrently rather than sequentially, potentially reducing the time required for evaluations.

Some implementations may distribute compliance controls as individual tasks, treating each task as a separate job. These jobs may be allocated across multiple threads to maximize processing efficiency. By breaking down the compliance framework into smaller units, the system may ensure that each control is processed independently and concurrently.

Some implementations may be designed to handle large-scale compliance frameworks that may involve hundreds or thousands of individual controls. The multi-threaded processing may allow the system to maintain high throughput and minimal latency, even in environments with complex compliance requirements.

The backend infrastructure in some implementations may support parallel processing by leveraging advanced computing hardware, which may include processors with multiple cores. Each processor core may execute multiple threads simultaneously, potentially optimizing the use of computational resources.

High-performance server hardware may be included in some implementations, featuring processors with multiple cores that may execute compliance assessment tasks in parallel. Memory modules may store active data related to compliance controls, while solid-state drives may provide high-speed data access and storage.

Some implementations may incorporate high-speed storage solutions, such as solid-state drives, to enable rapid retrieval and writing of compliance-related information. Active data related to compliance controls may be managed in memory modules to facilitate quick access and processing.

Some implementations may include backup storage systems to preserve compliance data and assessment results.

These systems may provide redundancy and recovery options in case of hardware failure or data loss. Compliance data may be securely stored and retrievable in the event of disruptions.

Some implementations may split individual prompts at the control level, allowing each control to be processed independently by a separate thread. This may avoid the inefficiencies of processing a single, large prompt and may enable smaller, discrete prompts to be processed across multiple threads.

Some implementations may support the use of multiple instances of large language models to process compliance controls concurrently. Each instance may handle a specific control, enabling simultaneous evaluation of multiple controls.

After individual compliance controls are processed across multiple threads, some implementations may aggregate the results to provide a comprehensive evaluation of the compliance framework. This aggregation may ensure that data from all threads is seamlessly integrated.

Aspects of the subject matter described in this disclosure can be implemented to realize one or more of the following potential advantages. The described techniques may be implemented to support enhanced scalability and flexibility in compliance assessment systems. By utilizing multi-threaded processing, the system may efficiently handle large volumes of compliance controls, potentially reducing the time required for evaluations. The modular design may facilitate easy integration and expansion within existing infrastructures, allowing organizations to adapt to evolving compliance requirements. High-performance computing resources may optimize the use of computational power, ensuring that compliance tasks are processed with minimal latency. Secure data transmission may be achieved through robust networking protocols, safeguarding sensitive compliance information during assessments. The system may provide redundancy and recovery options, preserving data integrity in the event of hardware failures or disruptions. Overall, these implementations may offer a streamlined approach to compliance assessments, potentially lowering operational costs and improving resource utilization.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to multi-threaded compliance assessment processing.

FIG. 1 illustrates an example of a system 100 that supports multi-threaded compliance assessment processing in accordance with various aspects of the present disclosure. The system 100 includes cloud clients 102, user devices 104, a cloud platform 106, and a data center 108. Cloud platform 106 may be an example of a public or private cloud network, such as a secure SaaS environment for compliance automation. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a server (e.g., cloud client 102-*a*), a smartphone (e.g., cloud client 102-*b*), or a laptop (e.g., cloud client 102-*c*). In other examples, a cloud client 102 may be a desktop computer, a tablet, a sensor, or another computing device or system capable of generating, analyzing, transmitting, or receiving communications. In some examples, a cloud client 102 may be part of a business, an enterprise, a non-profit, a startup, or any other organization type, such as a government agency or defense contractor seeking to automate compliance processes.

A cloud client 102 may facilitate communication between the data center 108 and one or multiple user devices 104 to implement an online environment for compliance management and automation. The network connection 112 may include communications, opportunities, purchases, sales, or any other interaction between a cloud client 102 and a user device 104, such as uploading compliance artifacts, reviewing compliance status, or collaborating on remediation actions. The network connection 112 may include a wired connection, a wireless connection, or both. A cloud client 102 may access cloud platform 106 to store, manage, and process the data communicated via one or more network connections 112, including compliance documentation, system security plans, and evidence artifacts. In some cases, the cloud client 102 may have an associated security or permission level, such as a role-based access control for compliance data. A cloud client 102 may have access to certain applications, data, and database information within cloud platform 106 based on the associated security or permission level, and may not have access to others.

The user device 104 may include a compliance processing component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-*a*, 112-*b*, 112-*c*, and 112-*d*) via a computer network. In an example, the user device 104 may be a computing device such as a wearable device 104-*a*, a smartphone 104-*b*, a laptop 104-*c*, or a server 104-*d*. In other cases, the user device 104 may be another computing system. In some cases, the user device 104 may be operated by a user or group of users. The user or group of users may be a customer, associated with a business, a manufacturer, or any other appropriate organization, such as a compliance officer, auditor, or IT administrator.

Cloud platform 106 may offer an on-demand database service to the cloud client 102, such as a compliance automation platform that ingests, analyzes, and manages compliance data and artifacts. In some cases, cloud platform 106 may be an example of a multi-tenant database system. In this case, cloud platform 106 may serve multiple cloud clients 102 with a single instance of software, supporting multiple organizations' compliance needs in a secure and isolated manner. However, other types of systems may be implemented, including—but not limited to—client-server systems, mobile device systems, and mobile network systems. In some cases, cloud platform 106 may support an online application. This may include support for compliance assessments, evidence management, automated document generation, remediation tracking, analytics, and integration with DevOps and security tools. Cloud platform 106 may receive data associated with generation of an online environment from the cloud client 102 over network connection 114, and may store and analyze the data, such as compliance artifacts, system configurations, and audit logs. In some cases, cloud platform 106 may receive data directly from a user device 104 and the cloud client 102. In some cases, the cloud client 102 may develop applications to run on cloud platform 106, such as custom compliance workflows or integrations. Cloud platform 106 may be implemented using remote servers. In some cases, the remote servers may be located at one or more data centers 108.

Data center 108 may include multiple servers. The multiple servers may be used for data storage, management, and processing, such as storing compliance evidence, running artificial intelligence (AI) models for compliance mapping, and maintaining audit trails. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes, such as encrypted backups and failover systems. In some cases, the data stored at data center 108 may be backed up by copies of the data at a different data center (not pictured).

Server system 110 may include cloud clients 102, a cloud platform 106, a compliance processing component 118, and a data center 108 that may coordinate with cloud platform 106 and data center 108 to implement an online environment for compliance automation and management. In some cases, data processing may occur at any of the components of server system 110, or at a combination of these components. Thus, the compliance processing component 118 may be included in the user device 104, server system 110, or in part or in whole in both. In some cases, servers may perform the data processing. The servers may be a cloud client 102 or located at data center 108.

Some or all of the functionality attributed to the compliance processing component 118 may be embodied or performed by one or more user devices 104, one or more components of server system 110 (e.g., cloud clients 102, a cloud platform 106, and/or a data center 108), and/or other components of system 100. The compliance processing component 118 may receive signals and inputs from user device 104 directly, via cloud clients 102, and/or via cloud platform 106 or data center 116.

As described herein, the compliance processing component 118 may implement multi-threaded compliance assessment processing by distributing compliance assessment tasks associated with a plurality of compliance controls across multiple threads of a multi-core processor. The compliance processing component 118 may assign individual assessment tasks to separate threads for concurrent execution, enabling parallel processing of the tasks. The results of the individual compliance assessments may be generated by the separate threads and subsequently aggregated into a unified compliance assessment output. This processing may occur within the user device 110, the server system 110, or a combination thereof, and may involve interactions with cloud clients 102, cloud platform 106, and/or data center 108 to facilitate data exchange and processing.

According to some implementations, open security controls assessment language (OSCAL) may provide a standardized, machine-readable format for expressing security and privacy control information. OSCAL may enable the automation of compliance processes by structuring documentation in data-centric formats such as XML, JSON, and YAML, thereby replacing traditional Word or Excel-based workflows. Through its extensible design, OSCAL may facilitate interoperability among compliance tools and systems, allowing organizations to share, validate, and maintain control implementations with increased consistency. OSCAL-formatted artifacts may further enable programmatic generation of system security plans (SSPs), continuous control assessments, and streamlined evidence collection, which may reduce the overall audit burden.

Some implementations may support compliance document generation, control mapping, or audit readiness within a constrained processing time, such as fifteen minutes. This performance metric may depend on the scope and complexity of the inputs, the nature of the integrated DevSecOps tools, and the degree of automation applied in the transformation of raw data into compliance-ready formats. Some implementations may incorporate parallel data pipelines, caching mechanisms, and real-time ingestion from source systems to support such rapid processing. While time-to-output may vary across use cases, achieving compliance processing within a short, repeatable time window may be a design goal.

Some implementations may incorporate a conversational AI interface to facilitate human-in-the-loop interactions. Some implementations may utilize natural language understanding to interpret user queries, provide contextual explanations of security controls, and guide remediation workflows. Some implementations interface with compliance artifacts and knowledge graphs to provide traceable answers and automate the generation or refinement of documentation based on user input. A chat-based interface may allow non-experts to interact with complex compliance requirements in an accessible and intuitive manner, thereby lowering barriers to adoption and increasing system usability.

Some implementations may provide POA&M management to centralize the tracking of identified compliance gaps, assigned remediations, and resolution timelines. This may interface with real-time monitoring systems and security assessments to auto-populate deficiencies and associate them with responsible stakeholders. Some implementations may apply prioritization heuristics or AI-based risk scoring to triage open issues. Audit history and control implementation data may be used to generate dynamically updated POA&M reports that reflect the current posture relative to required compliance frameworks.

Some implementations may incorporate continuous monitoring capabilities that ingest telemetry data from integrated DevOps and security tooling to assess control efficacy in real-time. Some implementations may normalize and map collected data to relevant control frameworks (e.g., NIST 800-53, CMMC), evaluate changes against compliance baselines, and trigger alerts or POA&M updates upon deviations. Such monitoring may support automated evidence collection and version control, ensuring audit readiness at all times. The monitoring engine may be configurable to support both periodic polling and event-driven ingestion patterns.

Some implementations may implement audit analysis functionality based on assessment procedures described in NIST SP 800-53A. These procedures may be codified into executable rule sets or workflows that evaluate control implementation details against defined objectives, thereby supporting risk-informed decision-making. Some implementations may allow tailoring of these procedures based on organizational context, system boundary definitions, and control inheritance models. Furthermore, integration with machine-readable standards such as OSCAL may allow for automatic generation of assessment plans and structured evaluation of test results in alignment with NIST guidance.

Some implementations may incorporate a mixture of experts (MoE) machine learning model architecture to dynamically route tasks to specialized AI sub-models. In such an architecture, each expert model may be trained to perform optimally over a particular subset of compliance-related tasks, such as control mapping, evidence generation, risk scoring, or remediation recommendation. A gating function may evaluate the input context and determine a weighted selection of one or more experts to produce the output. This architecture may enhance scalability and specialization across domains (e.g., cloud security vs. physical safeguards), while reducing compute costs by limiting inference to only a sparse subset of models. The MoE approach may also improve model performance by enabling expert specialization and continual learning across diverse regulatory regimes.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
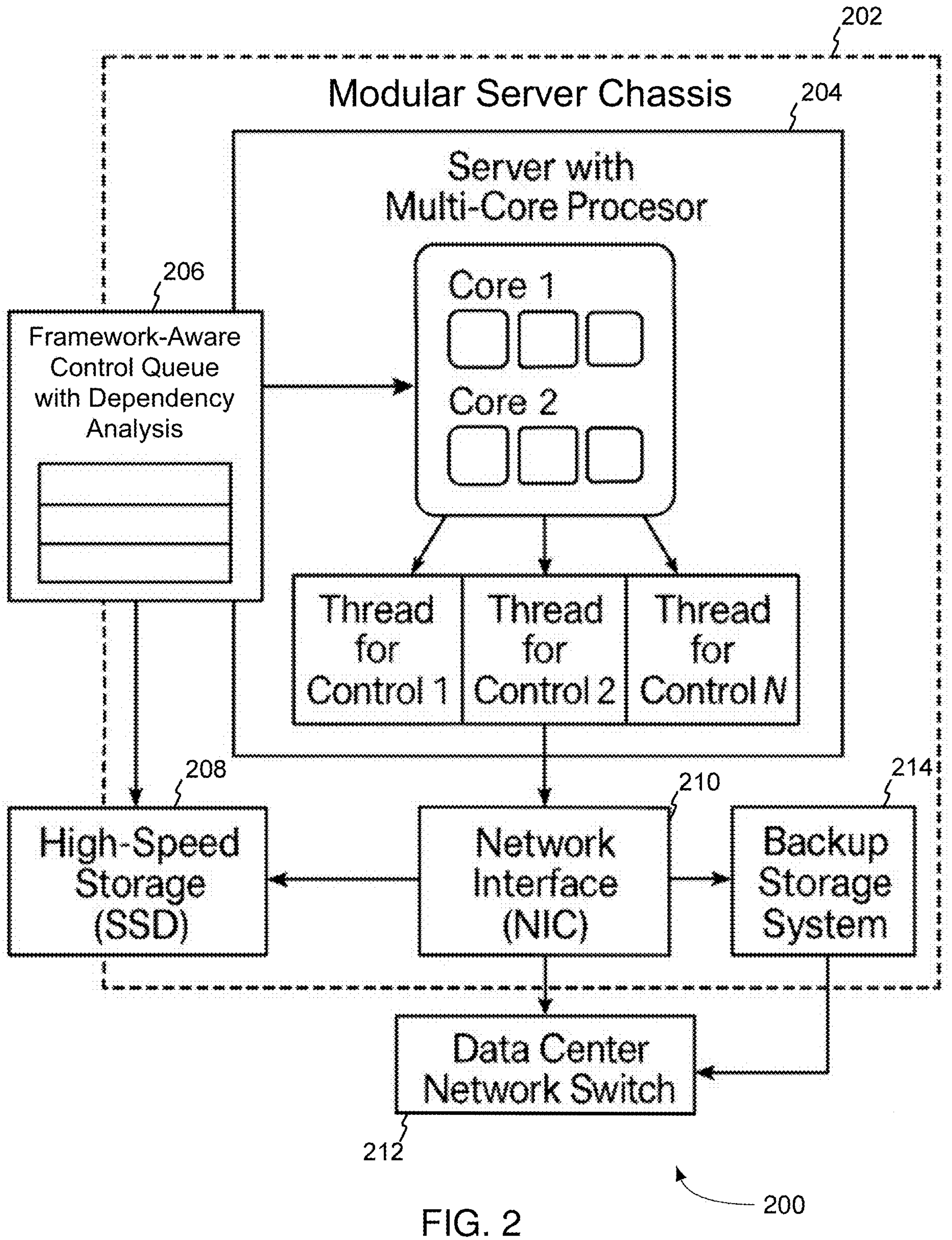
FIG. 2 shows a parallel architecture diagram which supports techniques for multi-threaded compliance assessment processing in accordance with various aspects of the present disclosure.

FIG. 2 shows parallel architecture diagram 200 which supports techniques for multi-threaded compliance assessment processing in accordance with various aspects of the present disclosure. As depicted in FIG. 2, the parallel architecture diagram 200 may include one or more of a modular server chassis 202, a server with multi-core processor 204, a framework-aware control queue with dependency analysis 206, a high-speed storage 208, a network interface card 210, a data center network switch 212, a backup storage system 214, and/or other components.

The modular server chassis 202 may include a scalable framework for housing server hardware. The modular server chassis 202 may be designed to accommodate multiple servers in a compact and organized manner, allowing for efficient use of space in data centers. The modular server chassis 202 may include integrated cooling systems to maintain optimal operating temperatures for the housed hardware during high-intensity workloads. The modular server chassis 202 may interact with other components, such as the server with multi-core processor 204, to ensure seamless operation within the compliance assessment system. In some implementations, the modular server chassis 202 may include alternative designs, such as blade server enclosures or tower configurations, depending on deployment requirements.

The server with multi-core processor 204 may represent a computing unit capable of executing multiple threads simultaneously. The server with multi-core processor 204 may include processors with multiple cores, each capable of handling separate compliance assessment tasks concurrently. The server with multi-core processor 204 may include memory modules to store active data during processing and may be connected to high-speed storage 208 for rapid data access. The server with multi-core processor 204 may interact with the framework-aware control queue with dependency analysis 206 to receive and execute assigned tasks. In some implementations, the server with multi-core processor 204 may include processors with varying core counts, such as quad-core or octa-core configurations, depending on performance requirements.

The framework-aware control queue with dependency analysis 206 may provide a mechanism for organizing and distributing compliance assessment tasks. The framework-aware control queue with dependency analysis 206 may include a scheduling system to allocate tasks to available threads on the server with multi-core processor 204. The framework-aware control queue with dependency analysis 206 may store metadata related to each compliance control, such as priority levels or dependencies, to ensure efficient task execution. The framework-aware control queue with dependency analysis 206 may interact with the server with multi-core processor 204 to dynamically adjust task assignments based on processing capacity. In some implementations, the framework-aware control queue with dependency analysis 206 may include alternative queue management systems, such as priority-based or round-robin scheduling algorithms.

The high-speed storage 208 may include solid-state drives for rapid data access and storage. The high-speed storage 208 may store compliance-related data, such as control definitions and assessment results, for quick retrieval during processing. The high-speed storage 208 may include interfaces for high-speed data transfer, such as NVMe or SATA connections, to minimize latency. The high-speed storage 208 may interact with the server with multi-core processor 204 to provide the necessary data for task execution. In some implementations, the high-speed storage 208 may include alternative storage solutions, such as hybrid drives or RAID configurations, to meet specific data center requirements.

The network interface card 210 may provide connectivity between servers and external network systems. The network interface card 210 may include ports for high-speed data transmission, such as Ethernet or fiber optic connections. The network interface card 210 may include protocols for secure communication, such as TLS or VPN, to protect compliance data during transfer. The network interface card 210 may interact with the data center network switch 212 to facilitate communication between servers and other network components. In some implementations, the network interface card 210 may include alternative connectivity options, such as wireless adapters or InfiniBand interfaces, depending on network infrastructure.

The data center network switch 212 may represent a device for managing data flow between servers and network components. The data center network switch 212 may include multiple ports to connect servers, storage systems, and external networks. The data center network switch 212 may include features for traffic management, such as VLANs or QoS settings, to prioritize compliance-related data. The data center network switch 212 may interact with the network interface card 210 to ensure efficient data transfer within the compliance assessment system. In some implementations, the data center network switch 212 may include alternative designs, such as modular switches or stackable configurations, to accommodate varying network sizes.

The backup storage system 214 may include redundant storage solutions for preserving compliance data. The backup storage system 214 may store copies of compliance assessment results and related artifacts to prevent data loss in case of hardware failure. The backup storage system 214 may include interfaces for high-speed data transfer, such as SAS or iSCSI connections, to facilitate regular backups. The backup storage system 214 may interact with the high-speed storage 208 to synchronize data and ensure consistency. In some implementations, the backup storage system 214 may include alternative solutions, such as cloud-based storage or tape drives, depending on organizational preferences.

In some implementations, the modular server chassis 202 may house the server with multi-core processor 204, which may be configured to execute compliance tasks by distributing them across multiple threads. The framework-aware control queue with dependency analysis 206 may interface with the server 204 to allocate specific compliance controls to individual threads, which may operate concurrently across the processor cores. The high-speed storage 208 may be connected to the server 204 to store and retrieve compliance-related data during processing, while the network interface card 210 may facilitate communication between the server 204 and the data center network switch 212.

In some implementations, the data center network switch 212 may manage the flow of information between the server 204 and external systems, coordinating data transfer for compliance assessments. The backup storage system 214 may be connected to the network interface card 210 to preserve compliance data and assessment results, which may be accessed in case of hardware failure or data loss. The arrangement of these components may allow the system to operate in a modular and scalable manner, with the server chassis 202 serving as the central framework for integrating processing, storage, and networking functionalities.

Figure 3:
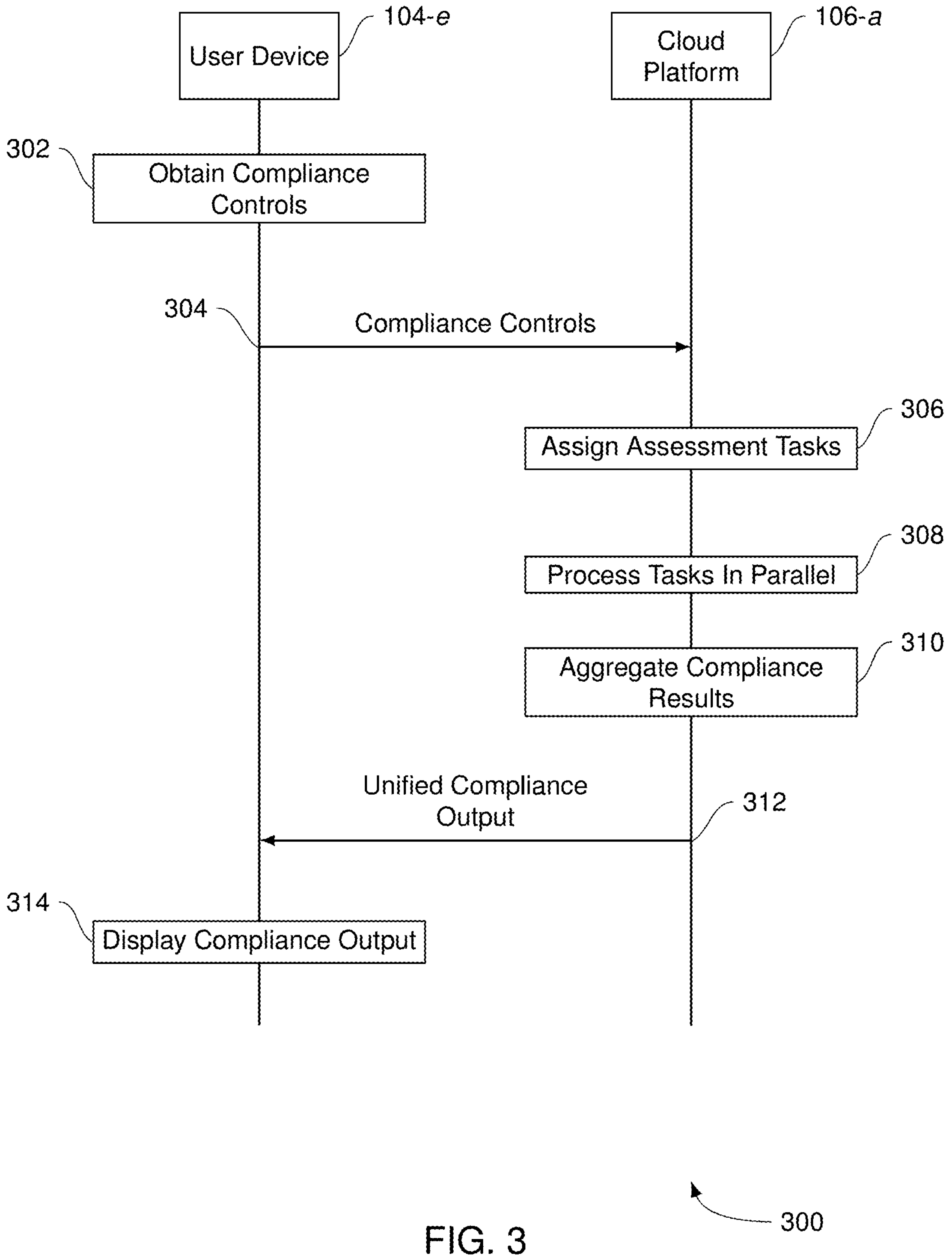
FIG. 3 illustrates an example of a process flow that supports multi-threaded compliance assessment processing in accordance with various aspects of the present disclosure.

FIG. 3 illustrates an example of a process flow 300 that supports multi-threaded compliance assessment processing in accordance with aspects of the present disclosure. In some examples, the process flow 300 may implement aspects of the system 100. For example, the process flow 300 may include a user device 104-*e* and a cloud platform 106-*a*, which may be examples of corresponding devices described herein. In some implementations, a user device 104-*e* transmits a plurality of compliance controls to a cloud platform 106-*a*, which assigns corresponding assessment tasks to separate threads of a multi-core processor for concurrent execution, processes the tasks in parallel to generate individual compliance results, and aggregates these results into a unified compliance assessment output.

At 302, the user device 104-*e* may obtain a plurality of compliance controls for evaluation, wherein each compliance control is associated with a corresponding assessment task. For example, the user device 104-*e* may retrieve compliance controls from a high-speed storage system connected to a cloud platform 106-*a*, where the controls may be organized into distinct categories based on regulatory frameworks. In some implementations, the user device 104-*e* may determine metadata associated with the compliance controls, such as priority levels or dependencies, which may influence the order in which the corresponding assessment tasks are processed.

At 304, the user device 104-*e* may transmit the plurality of compliance controls to the cloud platform 106-*a*. For example, the user device 104-*e* may send compliance controls in batches, where each batch may correspond to a specific category or regulatory framework. In some implementations, the user device 104-*e* may encrypt the compliance controls before transmission to the cloud platform 106-*a* to ensure secure communication. In other implementations, the user device 104-*e* may include metadata with the compliance controls, such as timestamps or identifiers, which may assist the cloud platform 106-*a* in organizing and processing the received data.

At 306, the cloud platform 106-*a* may assign individual assessment tasks to separate threads of a multi-core processor for concurrent execution. For example, the cloud platform 106-*a* may utilize a load-balancing algorithm to distribute tasks evenly across available processor cores, ensuring that no single core is overwhelmed with too many tasks. In some implementations, the cloud platform 106-*a* may dynamically adjust the number of threads based on the current workload and available resources, allowing for flexible scaling of processing power. The cloud platform 106-*a* may also incorporate a priority system, where tasks with higher urgency or importance are assigned to threads with faster processing capabilities, potentially reducing the time required for critical assessments. In other implementations, the cloud platform 106-*a* may employ a monitoring system to track the progress of each thread, enabling real-time adjustments to task assignments based on performance metrics.

At 308, the cloud platform 106-*a* may process the assessment tasks in parallel across the separate threads to generate individual compliance results. For example, the cloud platform 106-*a* may assign specific compliance controls to individual threads, where each thread may execute a distinct prompt tailored to the control being assessed. In some implementations, the cloud platform 106-*a* may utilize multiple instances of a large language model (LLM) to handle separate threads concurrently, allowing for simultaneous processing of compliance controls while maintaining the ability to aggregate results at the end of the process. In other implementations, the cloud platform 106-*a* may dynamically allocate resources to threads based on the complexity or size of the compliance controls, ensuring that larger or more intricate tasks may receive additional processing power.

At 310, the cloud platform 106-*a* may aggregate the compliance results from the separate threads into a unified compliance assessment output. For example, the cloud platform 106-*a* may merge results from individual threads into a structured database, where compliance data may be categorized by control type or regulatory framework. In some implementations, the cloud platform 106-*a* may apply a reconciliation process to identify and resolve inconsistencies in the compliance results before generating the unified output. In other implementations, the cloud platform 106-*a* may format the aggregated results into a report that may include metadata such as timestamps, thread identifiers, or processing durations for each compliance control.

At 312, the cloud platform 106-*a* may transmit the unified compliance assessment output to the user device 104-*e*. For example, the cloud platform 106-*a* may send the unified compliance assessment output as a structured report formatted in JSON or XML, which may allow the user device 104-*e* to parse and display the data in a user-friendly interface. In some implementations, the cloud platform 106-*a* may encrypt the unified compliance assessment output before transmission to the user device 104-*e* to ensure secure communication. In other implementations, the cloud platform 106-*a* may include metadata with the unified compliance assessment output, such as processing timestamps or thread identifiers, which may assist the user device 104-*e* in organizing and interpreting the received data.

At 314, the user device 104-*e* may display the unified compliance assessment output to the user. For example, the user device 104-*e* may render the output as an interactive dashboard, where compliance results may be organized by control categories or regulatory frameworks. In some implementations, the user device 104-*e* may display the output as a downloadable report in formats such as PDF or CSV, allowing the user to access compliance data offline. In other implementations, the user device 104-*e* may present the output with visual elements such as graphs or charts, which may assist the user in interpreting trends or patterns within the compliance results.

Figure 4:
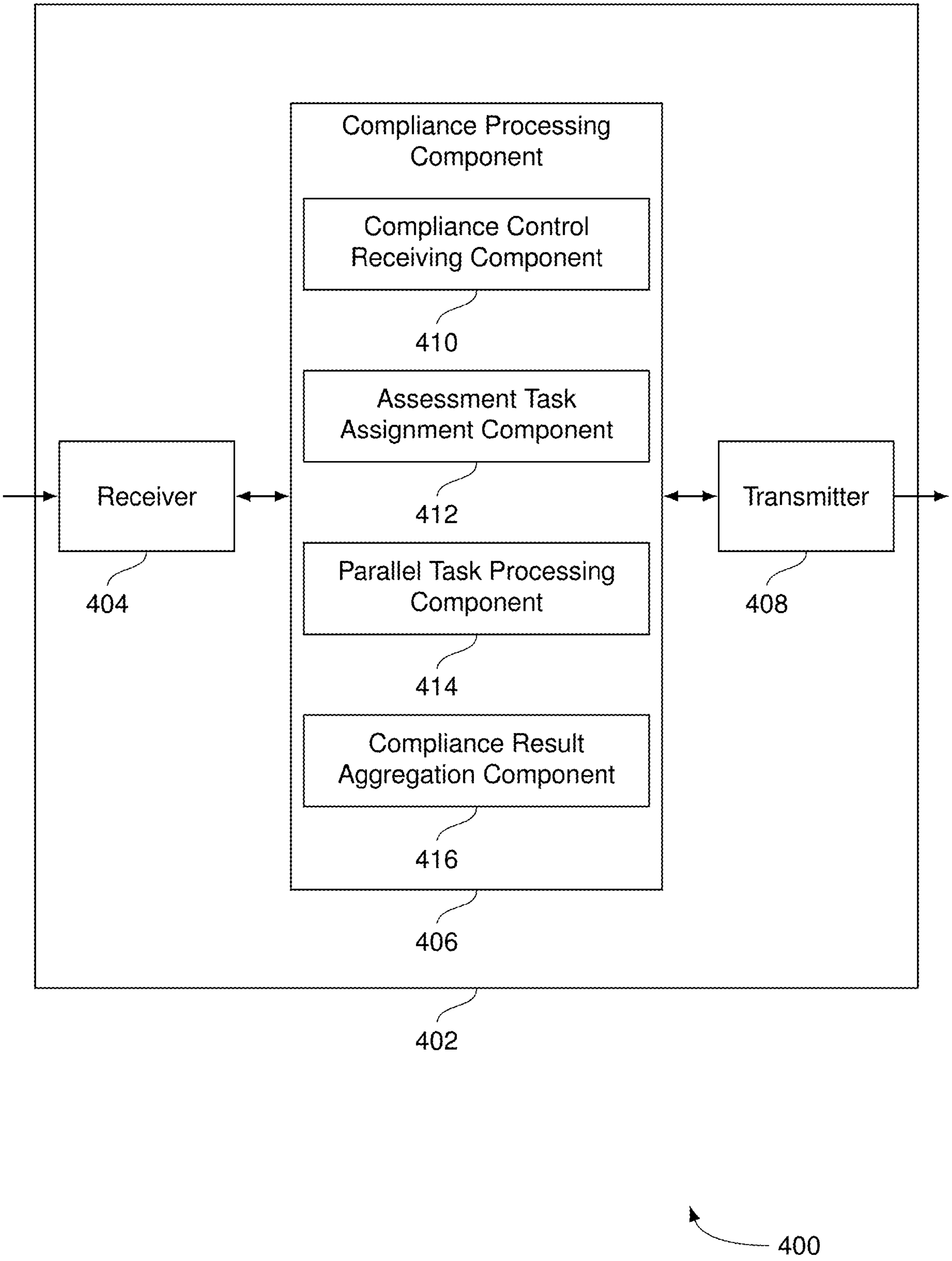
FIG. 4 shows a block diagram of an apparatus that supports multi-threaded compliance assessment processing in accordance with various aspects of the present disclosure.

FIG. 4 shows a block diagram 400 of an apparatus 402 that supports multi-threaded compliance assessment processing in accordance with various aspects of the present disclosure. The apparatus 402 may include an input module 404, compliance processing component 406, and an output module 408. The apparatus 402 may also include a processor. Each of these components may be in communication with one another (e.g., via one or more buses). In some cases, the apparatus 402 may be an example of a user terminal, a database server, or a system containing multiple computing devices.

The input module 404 may manage input signals for the apparatus 402. For example, the input module 404 may identify input signals based on an interaction with a modem, a keyboard, a mouse, a touchscreen, or a similar device. These input signals may be associated with user input or processing at other components or devices. In some cases, the input module 404 may utilize an operating system such as iOS®, ANDROID®, MS-DOS®, MS-WINDOWS®, OS/2®, UNIX®, LINUX®, or another known operating system to handle input signals. The input module 404 may send aspects of these input signals to other components of the apparatus 402 for processing. For example, the input module 404 may transmit input signals to the compliance processing component 406 to support face detection to address privacy in publishing image datasets. In some cases, the input module 404 may be a component of an input/output (I/O) controller 606 as described with reference to FIG. 6.

The compliance processing component 406 may include one or more of a compliance control receiving component 410, an assessment task assignment component 412, a parallel task processing component 414, a compliance result aggregation component 416, and/or other components. The compliance processing component 406 may be an example of aspects of the compliance processing component 502 or 604 described with reference to FIGS. 5 and 6.

The compliance control receiving component 410 may be configured as or otherwise support a means for receiving a plurality of compliance controls for evaluation, wherein each compliance control may be associated with a corresponding assessment task. The assessment task assignment component 412 may be configured as or otherwise support a means for assigning individual assessment tasks to separate threads of a multi-core processor for concurrent execution. The parallel task processing component 414 may be configured as or otherwise support a means for processing the assessment tasks in parallel across the separate threads to generate individual compliance results. The compliance result aggregation component 416 may be configured as or otherwise support a means for aggregating the compliance results from the separate threads into a unified compliance assessment output.

The output module 408 may manage output signals for the apparatus 402. For example, the output module 408 may receive signals from other components of the apparatus 402, such as the compliance processing component 406, and may transmit these signals to other components or devices. In some specific examples, the output module 408 may transmit output signals for display in a user interface, for storage in a database or data store, for further processing at a server or server cluster, or for any other processes at any number of devices or systems. In some cases, the output module 408 may be a component of an I/O controller 606 as described with reference to FIG. 6.

Figure 5:
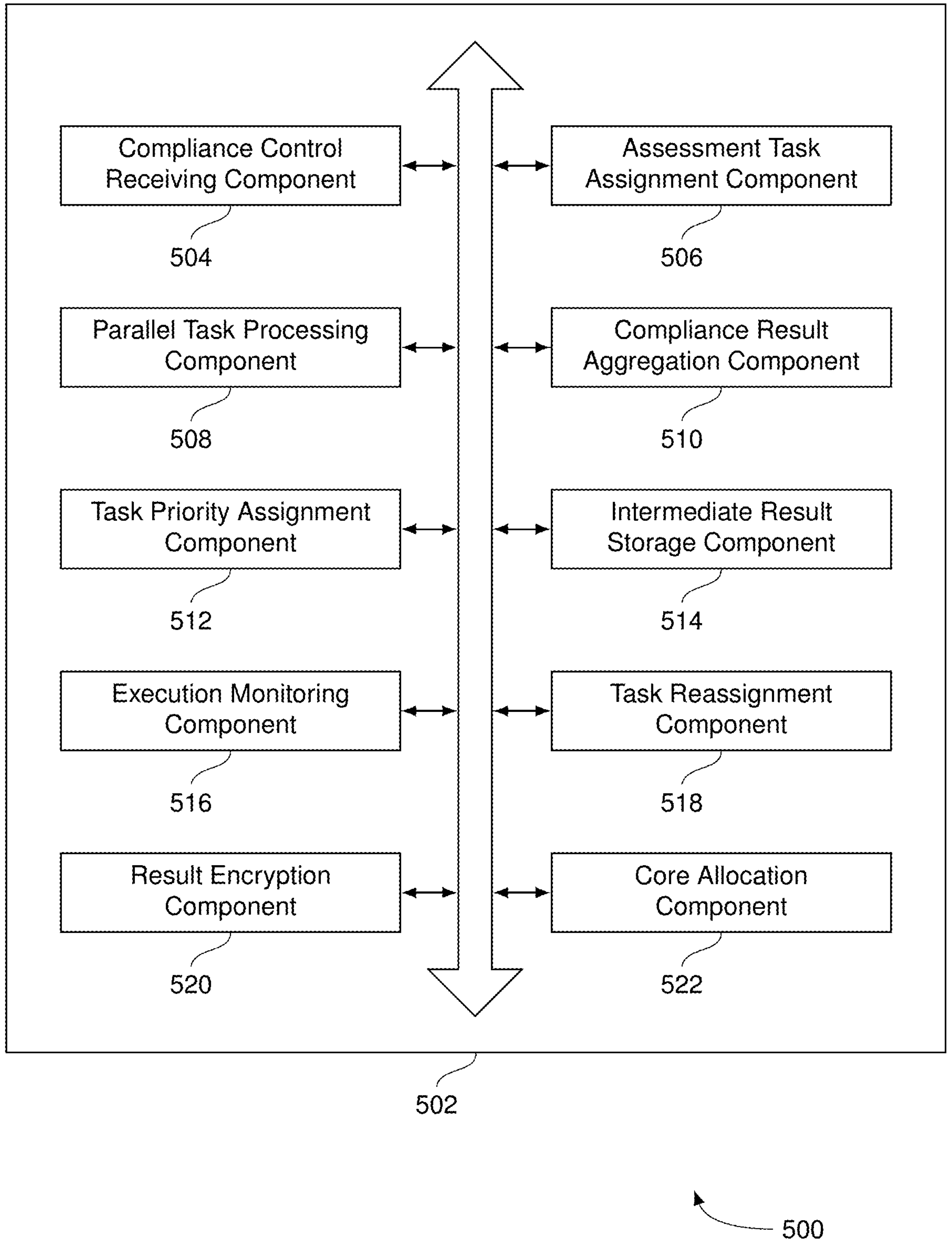
FIG. 5 shows a block diagram of a compliance processing component that supports multi-threaded compliance assessment processing in accordance with various aspects of the present disclosure.

FIG. 5 shows a block diagram 500 of a compliance processing component 502 that supports multi-threaded compliance assessment processing in accordance with various aspects of the present disclosure. The compliance processing component 502 may be an example of aspects of a compliance processing component 406, a compliance processing component 604, or both, as described herein. The compliance processing component 502, or various components thereof, may be an example of means for performing various aspects of multi-threaded compliance assessment processing as described herein. For example, the compliance processing component 502 may include one or more of a compliance control receiving component 504, an assessment task assignment component 506, a parallel task processing component 508, a compliance result aggregation component 510, a task priority assignment component 512, an intermediate result storage component 514, an execution monitoring component 516, a task reassignment component 518, a result encryption component 520, a core allocation component 522, and/or other components. Each of these components may communicate, directly or indirectly, with one another (e.g., via one or more buses).

The compliance control receiving component 504 may be configured as or otherwise support a means for receiving a plurality of compliance controls for evaluation, wherein each compliance control may be associated with a corresponding assessment task. In some implementations, the compliance control receiving component 504 may receive compliance controls from a centralized database that may store regulatory frameworks and associated control definitions. The compliance control receiving component 504 may alternatively retrieve compliance controls from distributed systems that may operate across multiple data centers. In some implementations, the compliance control receiving component 504 may support integration with external APIs that may allow for dynamic updates to compliance control sets based on changes in regulatory requirements. The compliance control receiving component 504 may further include functionality to parse incoming compliance controls, which may be formatted as structured data, such as JSON or XML, to facilitate compatibility with downstream processing systems.

The assessment task assignment component 506 may be configured as or otherwise support a means for assigning individual assessment tasks to separate threads of a multi-core processor for concurrent execution. In some implementations, the assessment task assignment component 506 may determine the number of available threads on the multi-core processor and allocate tasks based on thread capacity. In some implementations, the assessment task assignment component 506 may assign tasks based on priority levels, where higher-priority tasks may be allocated to threads with faster processing capabilities. In some implementations, the assessment task assignment component 506 may support dynamic reassignment of tasks to threads that may become available during execution, allowing for flexible task distribution.

The parallel task processing component 508 may be configured as or otherwise support a means for processing the assessment tasks in parallel across the separate threads to generate individual compliance results. In some implementations, the parallel task processing component 508 may process assessment tasks by leveraging thread-specific memory allocations to store intermediate compliance data during execution. In some implementations, the parallel task processing component 508 may support thread synchronization mechanisms to coordinate the completion of tasks and prevent data conflicts between threads. In some implementations, the parallel task processing component 508 may incorporate error-handling routines that may detect and address thread-specific processing anomalies during task execution.

The compliance result aggregation component 510 may be configured as or otherwise support a means for aggregating the compliance results from the separate threads into a unified compliance assessment output. In some implementations, the compliance result aggregation component 510 may employ data structures that may organize compliance results based on control categories or assessment criteria. In some implementations, the compliance result aggregation component 510 may support integration with visualization tools that may represent aggregated compliance data in graphical formats for easier interpretation.

In some examples, the task priority assignment component 512 may be configured as or otherwise support a means for assigning priority levels to the assessment tasks based on predefined criteria, wherein the separate threads may process higher-priority tasks before lower-priority tasks. In some implementations, the task priority assignment component 512 may determine priority levels based on the complexity of the compliance controls, where tasks associated with more intricate controls may be assigned higher priority. In some implementations, the task priority assignment component 512 may assign priority levels based on deadlines associated with specific compliance controls, where tasks with imminent deadlines may be processed first. In some implementations, the task priority assignment component 512 may support integration with external scheduling systems that may dynamically update priority levels based on changes in regulatory requirements.

In some examples, the intermediate result storage component 514 may be configured as or otherwise support a means for storing intermediate compliance results that may be generated by the separate threads in a high-speed storage system, wherein the intermediate compliance results may be retrieved for aggregation into the unified compliance assessment output. In some implementations, the intermediate result storage component 514 may store intermediate compliance results in a distributed storage architecture that may span multiple physical servers to accommodate large-scale data sets. In some implementations, the intermediate result storage component 514 may support encryption mechanisms that may secure the intermediate compliance results during storage to meet regulatory data protection requirements. In some implementations, the intermediate result storage component 514 may include functionality to index the stored intermediate compliance results based on control identifiers, which may allow for faster retrieval during the aggregation process.

In some examples, the execution monitoring component 516 may be configured as or otherwise support a means for monitoring execution of the separate threads to detect processing anomalies, wherein detected anomalies may trigger reassignment of the affected assessment tasks to available separate threads. In some implementations, the execution monitoring component 516 may monitor thread execution by analyzing real-time performance metrics, such as thread processing speed or memory usage, to identify irregularities. In some implementations, the execution monitoring component 516 may detect anomalies by comparing thread outputs against predefined compliance control benchmarks, which may indicate deviations from expected results. In some implementations, the execution monitoring component 516 may employ logging mechanisms to record thread activity, which may assist in identifying patterns associated with processing anomalies.

In some implementations, the execution monitoring component 516 may trigger reassignment of affected assessment tasks by dynamically reallocating tasks to threads with lower workloads, which may reduce the likelihood of further anomalies. In some implementations, the execution monitoring component 516 may reassign tasks to threads operating on separate processors, which may isolate the affected tasks from potential hardware-related issues. In some implementations, the execution monitoring component 516 may support integration with external task scheduling systems, which may determine reassignment strategies based on historical thread performance data.

In some examples, the task reassignment component 518 may be configured as or otherwise support a means for reassigning affected assessment tasks to available separate threads in response to detected anomalies. In some implementations, the task reassignment component 518 may determine thread availability by monitoring real-time workload metrics, such as active thread counts or processing speeds. In some implementations, the task reassignment component 518 may reassign tasks to threads based on proximity to the affected task's data storage location, which may reduce data transfer delays during reassignment. In some implementations, the task reassignment component 518 may incorporate predictive algorithms to anticipate thread availability based on historical performance patterns.

In some examples, the result encryption component 520 may be configured as or otherwise support a means for encrypting the compliance results generated by the separate threads prior to aggregation, wherein the encryption may ensure secure transmission of the unified compliance assessment output. In some implementations, the result encryption component 520 may employ advanced cryptographic algorithms to encrypt compliance results, which may include symmetric or asymmetric encryption techniques. In some implementations, the result encryption component 520 may support integration with external key management systems that may dynamically generate and distribute encryption keys to secure compliance data. In some implementations, the result encryption component 520 may include functionality to verify the integrity of encrypted compliance results, which may involve checksum or hash-based validation methods.

In some examples, the core allocation component 522 may be configured as or otherwise support a means for dynamically allocating processor cores to the separate threads based on workload distribution, wherein the allocation may adjust in response to changes in the number of assessment tasks. In some implementations, the core allocation component 522 may determine the workload distribution by analyzing the complexity of the assessment tasks assigned to the threads. In some implementations, the core allocation component 522 may allocate processor cores based on historical data patterns that may predict the expected resource demands of specific assessment tasks.

In some implementations, the core allocation component 522 may reallocate processor cores to threads that may experience increased processing delays due to unexpected task complexity. In some implementations, the core allocation component 522 may support integration with external monitoring systems that may provide real-time updates on thread performance metrics to guide core allocation adjustments. In some implementations, the core allocation component 522 may include functionality to reserve processor cores for high-priority threads that may require immediate processing resources.

Figure 6:
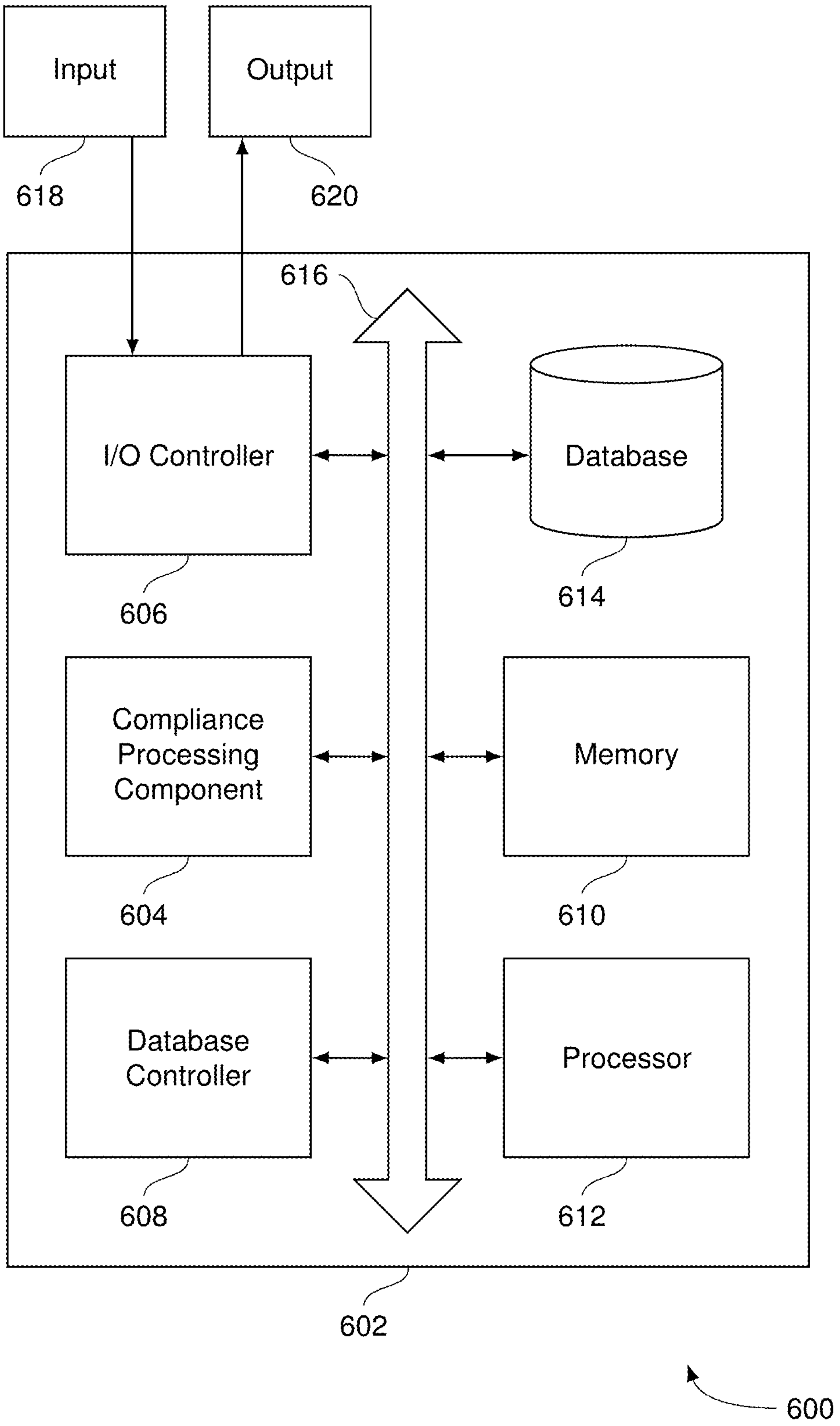
FIG. 6 shows a diagram of a system including a device that supports multi-threaded compliance assessment processing in accordance with various aspects of the present disclosure.

FIG. 6 shows a diagram of a system 600 including a device 602 that supports multi-threaded compliance assessment processing in accordance with aspects of the present disclosure. The device 602 may be an example of or include the components of a database server or an apparatus 402 as described herein. The device 602 may include components for bi-directional data communications including components for transmitting and receiving communications, including a compliance processing component 604, an I/O controller 606, a database controller 608, memory 610, a processor 612, and a database 614. These components may be in electronic communication via one or more buses (e.g., bus 616).

The compliance processing component 604 may be an example of a compliance processing component 406 or 502 as described herein. For example, the compliance processing component 604 may perform any of the methods or processes described above with reference to FIGS. 4 and 5. In some cases, the compliance processing component 604 may be implemented in hardware, software executed by a processor, firmware, or any combination thereof.

The I/O controller 606 may manage input signals 618 and output signals 620 for the device 602. The I/O controller 606 may also manage peripherals not integrated into the device 602. In some cases, the I/O controller 606 may represent a physical connection or port to an external peripheral. In some cases, the I/O controller 606 may utilize an operating system such as iOS®, ANDROID®, MS-DOS®, MS-WINDOWS®, OS/2®, UNIX®, LINUX®, or another known operating system. In other cases, the I/O controller 606 may represent or interact with a modem, a keyboard, a mouse, a touchscreen, or a similar device. In some cases, the I/O controller 606 may be implemented as part of a processor. In some cases, a user may interact with the device 602 via the I/O controller 606 or via hardware components controlled by the I/O controller 606.

The database controller 608 may manage data storage and processing in a database 614. In some cases, a user may interact with the database controller 608. In other cases, the database controller 608 may operate automatically without user interaction. The database 614 may be an example of a single database, a distributed database, multiple distributed databases, a data store, a data lake, or an emergency backup database.

Memory 610 may include random-access memory (RAM) and read-only memory (ROM). The memory 610 may store computer-readable, computer-executable software including instructions that, when executed, cause the processor to perform various functions described herein. In some cases, the memory 610 may contain, among other things, a basic input/output system (BIOS) which may control basic hardware or software operation such as the interaction with peripheral components or devices.

The processor 612 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 612 may be configured to operate a memory array using a memory controller. In other cases, a memory controller may be integrated into the processor 612. The processor 612 may be configured to execute computer-readable instructions stored in a memory 610 to perform various functions (e.g., functions or tasks supporting multi-threaded compliance assessment processing).

Figure 7:
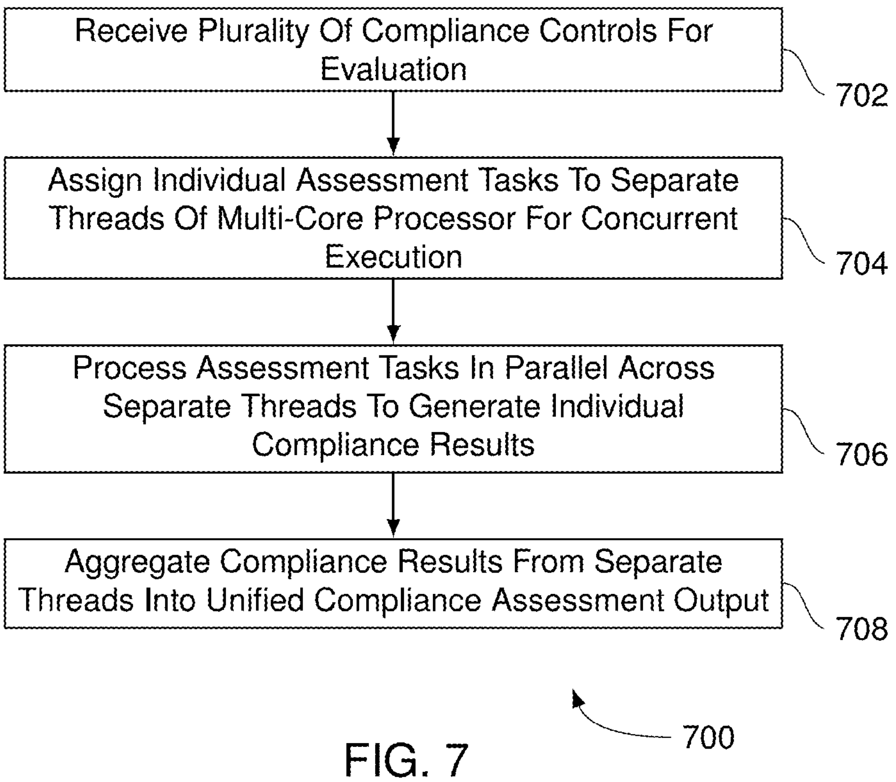
FIGS. 7 and 8 show flowcharts illustrating methods that support multi-threaded compliance assessment processing in accordance with various aspects of the present disclosure.

FIG. 7 shows a flowchart illustrating a method 700 that supports multi-threaded compliance assessment processing in accordance with various aspects of the present disclosure. The operations of the method 700 may be implemented by one or more components of a networked computing system as described herein. For example, the operations of the method 700 may be performed by a compliance processing component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 702, the method 700 may include receiving a plurality of compliance controls for evaluation, wherein each compliance control is associated with a corresponding assessment task. The operations of 702 may be performed in accordance with examples as disclosed herein. In some examples, aspects of the operations of 702 may be performed by a compliance control receiving component 504 as described with reference to FIG. 5.

At 704, the method 700 may include assigning individual assessment tasks to separate threads of a multi-core processor for concurrent execution. The operations of 704 may be performed in accordance with examples as disclosed herein. In some examples, aspects of the operations of 704 may be performed by an assessment task assignment component 506 as described with reference to FIG. 5.

At 706, the method 700 may include processing the assessment tasks in parallel across the separate threads to generate individual compliance results. The operations of 706 may be performed in accordance with examples as disclosed herein. In some examples, aspects of the operations of 706 may be performed by a parallel task processing component 508 as described with reference to FIG. 5.

At 708, the method 700 may include aggregating the compliance results from the separate threads into a unified compliance assessment output. The operations of 708 may be performed in accordance with examples as disclosed herein. In some examples, aspects of the operations of 708 may be performed by a compliance result aggregation component 510 as described with reference to FIG. 5.

Figure 8:
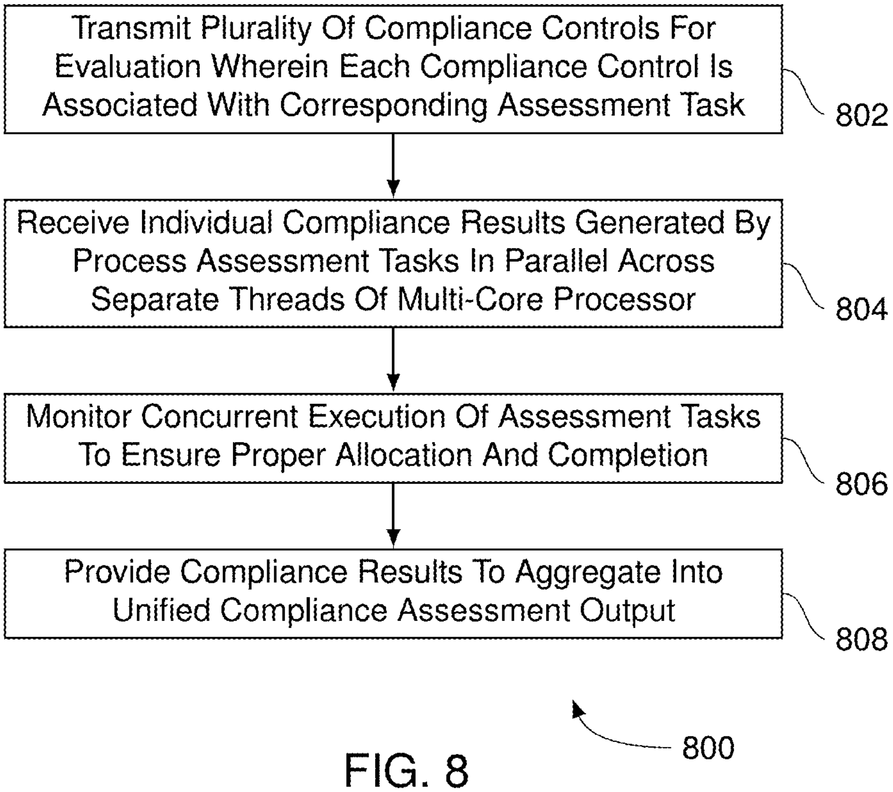

FIG. 8 shows a flowchart illustrating a method 800 that supports multi-threaded compliance assessment processing in accordance with various aspects of the present disclosure. The operations of the method 800 may be implemented by one or more components of a networked computing system as described herein. For example, the operations of the method 800 may be performed by a compliance processing component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 802, the method 800 may include transmitting a plurality of compliance controls for evaluation, wherein each compliance control is associated with a corresponding assessment task. The operations of 802 may be performed in accordance with examples as disclosed herein. In some examples, aspects of the operations of 802 may be performed by a compliance control receiving component 504 as described with reference to FIG. 5.

At 804, the method 800 may include receiving individual compliance results generated by processing the assessment tasks in parallel across separate threads of a multi-core processor. The operations of 804 may be performed in accordance with examples as disclosed herein. In some examples, aspects of the operations of 804 may be performed by a parallel task processing component 508 as described with reference to FIG. 5.

At 806, the method 800 may include monitoring the concurrent execution of the assessment tasks to ensure proper allocation and completion. The operations of 806 may be performed in accordance with examples as disclosed herein. In some examples, aspects of the operations of 806 may be performed by an execution monitoring component 516 as described with reference to FIG. 5.

At 808, the method 800 may include providing the compliance results to aggregate into a unified compliance assessment output. The operations of 808 may be performed in accordance with examples as disclosed herein. In some examples, aspects of the operations of 808 may be performed by a compliance result aggregation component 510 as described with reference to FIG. 5.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for multi-threaded compliance assessment processing, comprising:

receiving a plurality of compliance controls for evaluation against regulatory requirements, wherein each compliance control in the plurality of compliance controls is associated with a corresponding assessment task, the plurality of compliance controls for evaluation including a first compliance control associated with a first assessment task and a second compliance control associated with a second assessment task;

assigning individual assessment tasks to separate threads of a multi-core processor for concurrent execution, including assigning the first assessment task to a first thread and assigning the second assessment task to a second thread;

processing the assessment tasks in parallel across the separate threads to generate individual compliance results, including processing, in parallel, the first assessment task in the first thread to generate a first compliance result and the second assessment task in the second thread to generate a second compliance result;

generating a unified compliance assessment output upon aggregating the compliance results from the separate threads, including generating the unified compliance assessment output upon aggregating the first compliance result and the second compliance result; and encrypting the compliance results generated by the separate threads prior to aggregation, wherein the encrypting facilitates secure transmission of the unified compliance assessment output.

2. The method of claim 1, further comprising assigning priority levels to the assessment tasks based on predefined criteria, wherein the separate threads process higher-priority tasks before lower-priority tasks.

3. The method of claim 1, further comprising storing intermediate compliance results generated by the separate threads in a high-speed storage system, wherein the intermediate compliance results are retrieved for the aggregation into the unified compliance assessment output.

4. The method of claim 1, further comprising monitoring execution of the separate threads to detect processing anomalies, wherein detected anomalies trigger reassignment of anomalous assessment tasks to available ones of the separate threads.

5. The method of claim 1, further comprising dynamically allocating processor cores to the separate threads based on workload distribution, wherein the allocation adjusts in response to changes in a quantity of the assessment tasks.

6. The method of claim 1, further comprising generating metadata for the compliance results produced by the separate threads, wherein the metadata includes timestamps and thread identifiers for tracking processing history.

7. The method of claim 1, further comprising validating the compliance results generated by the separate threads against predefined accuracy thresholds, wherein validation failures trigger reprocessing of corresponding ones of the assessment tasks.

8. The method of claim 1, further comprising compressing the compliance results generated by the separate threads prior to the aggregation, wherein the compressing reduces data size for efficient storage and transmission.

9. The method of claim 1, further comprising assigning the assessment tasks to the separate threads based on task complexity, wherein threads with higher processing capacity handle more complex tasks.

10. A system configured for multi-threaded compliance assessment processing, comprising:

a processor;

memory coupled with the processor; and instructions stored in the memory and executable by the processor to cause the system to:

receive a plurality of compliance controls for evaluation against regulatory requirements, wherein each compliance control in the plurality of compliance controls is associated with a corresponding assessment task, the plurality of compliance controls for evaluation including a first compliance control associated with a first assessment task and a second compliance control associated with a second assessment task;

assign individual assessment tasks to separate threads of a multi-core processor for concurrent execution, including assigning the first assessment task to a first thread and assigning the second assessment task to a second thread;

process the assessment tasks in parallel across the separate threads to generate compliance results, including processing, in parallel, the first assessment task in the first thread to generate a first compliance result and the second assessment task in the second thread to produce a second compliance result;

generate a unified compliance assessment output upon aggregating the compliance results from the separate threads, including generating the unified compliance assessment output upon aggregating the first compliance result and the second compliance result; and encrypt the compliance results generated by the separate threads prior to aggregation, wherein encrypting facilitates secure transmission of the unified compliance assessment output.

11. The system of claim 10, wherein the instructions are further executable by the processor to cause the system to: assign priority levels to the assessment tasks based on predefined criteria, wherein the separate threads process higher-priority tasks before lower-priority tasks.

12. The system of claim 10, wherein the instructions are further executable by the processor to cause the system to: store intermediate compliance results generated by the separate threads in a high-speed storage system, wherein the intermediate compliance results are retrieved for the aggregation into the unified compliance assessment output.

13. The system of claim 10, wherein the instructions are further executable by the processor to cause the system to: monitor execution of the separate threads to detect processing anomalies, wherein detected anomalies trigger reassignment of anomalous assessment tasks to available ones of the separate threads.

14. The system of claim 10, wherein the instructions are further executable by the processor to cause the system to: dynamically allocate processor cores to the separate threads based on workload distribution, wherein the allocation adjusts in response to changes in a quantity of the assessment tasks.

15. The system of claim 10, wherein the instructions are further executable by the processor to cause the system to: generate metadata for the compliance results produced by the separate threads, wherein the metadata includes timestamps and thread identifiers for tracking processing history.

16. The system of claim 10, wherein the instructions are further executable by the processor to cause the system to: validate the compliance results generated by the separate threads against predefined accuracy thresholds, wherein validation failures trigger reprocessing of corresponding ones of the assessment tasks.

17. The system of claim 10, wherein the instructions are further executable by the processor to cause the system to: compress the compliance results generated by the separate threads prior to the aggregation, wherein compression of the compliance results reduces data size for efficient storage and transmission.

18. A non-transitory computer-readable medium storing code for multi-threaded compliance assessment processing, the code comprising instructions executable by a processor to:

receive a plurality of compliance controls for evaluation against regulatory requirements, wherein each compliance control in the plurality of compliance controls is associated with a corresponding assessment task, the plurality of compliance controls for evaluation including a first compliance control associated with a first assessment task and a second compliance control associated with a second assessment task;

assign individual assessment tasks to separate threads of a multi-core processor for concurrent execution, including assigning the first assessment task to a first thread and assigning the second assessment task to a second thread;

process the assessment tasks in parallel across the separate threads to generate individual compliance results, including processing, in parallel, the first assessment task in the first thread to generate a first compliance result and the second assessment task in the second thread to produce a second compliance result;

generate a unified compliance assessment output upon aggregating the compliance results from the separate threads into a unified compliance assessment output, including generating the unified compliance assessment output upon aggregating the first compliance result and the second compliance result; and encrypt the compliance results generated by the separate threads prior to aggregation, wherein encrypting facilitates secure transmission of the unified compliance assessment output.

19. The non-transitory computer-readable medium of claim 18, wherein the code comprises further instructions executable by the processor to: compress the compliance results generated by the separate threads prior to the aggregation, wherein compression reduces data size for efficient storage and transmission.

20. The non-transitory computer-readable medium of claim 18, wherein the code comprises further instructions executable by the processor to: assign the assessment tasks to the separate threads based on task complexity, wherein threads with higher processing capacity handle more complex tasks.

* * * * *